(12) United States Patent
Wang

(10) Patent No.: US 8,094,467 B2
(45) Date of Patent: Jan. 10, 2012

(54) INDUCTION POWER SYSTEM

(75) Inventor: Chweisen Wang, Taichung County (TW)

(73) Assignee: Amidof Technology Co., Ltd., Taichung County (TW)

( * ) Notice: Subject to any disclaimer, the term of this patent is extended or adjusted under 35 U.S.C. 154(b) by 30 days.

(21) Appl. No.: 12/531,190

(22) PCT Filed: Dec. 21, 2007

(86) PCT No.: PCT/CN2007/003734
§ 371 (c)(1),
(2), (4) Date: Sep. 14, 2009

(87) PCT Pub. No.: WO2008/119218
PCT Pub. Date: Oct. 9, 2008

(65) Prior Publication Data
US 2010/0097830 A1  Apr. 22, 2010

(30) Foreign Application Priority Data
Mar. 29, 2007 (CN) .......................... 2007 1 0089554

(51) Int. Cl.
*H02M 7/155* (2006.01)
*H02M 7/162* (2006.01)
*H02M 7/17* (2006.01)
(52) U.S. Cl. .................. 363/21.02; 363/17; 363/127
(58) Field of Classification Search .............. 363/34, 363/37, 123, 17, 21.02, 125, 127; 336/118, 336/119
See application file for complete search history.

(56) References Cited

U.S. PATENT DOCUMENTS

| | | | |
|---|---|---|---|
| 4,593,167 A * | 6/1986 | Nilssen | 219/715 |
| 4,914,539 A | 4/1990 | Turner et al. | |
| 5,045,770 A | 9/1991 | Brooks | |
| 5,293,308 A | 3/1994 | Boys et al. | |
| 5,702,431 A | 12/1997 | Wang et al. | |
| 6,252,386 B1 | 6/2001 | Minami et al. | |
| 6,515,878 B1 | 2/2003 | Meins et al. | |
| 6,705,441 B1 | 3/2004 | Boys et al. | |
| 7,009,860 B2 | 3/2006 | Kazutoshi | |
| 7,019,620 B2 | 3/2006 | Bohler et al. | |

FOREIGN PATENT DOCUMENTS
CN 1105414 A 7/1995
KR 20060076796 A 7/2006
* cited by examiner

*Primary Examiner* — Gary L Laxton
*Assistant Examiner* — Nusrat Quddus
(74) *Attorney, Agent, or Firm* — James W. Huffman

(57) ABSTRACT

An induction power system configured to drive a load includes a primary side circuit (PSC) and a secondary side circuit (SSC). The PSC has a main inductor configured to generate a current-induced magnetic field. The SSC has an induction electrification unit (IEU) and a power distribution unit (PDU). The IEU has a first inductor and a second inductor connected in series, and is adjacent to the main inductor to generate an induced AC. The PDU has a first capacitor, a second capacitor, and a switching device. The first capacitor and the first inductor are connected in series and generate a series resonance to supply a control power. The second capacitor is connected in parallel with the first inductor, the second inductor, and the first capacitor, and generates a parallel resonance, to provide a load power. When the switching device is turned on, the load power is supplied to the load.

4 Claims, 7 Drawing Sheets

INDUCTION POWER SYSTEM

BACKGROUND OF THE INVENTION

1. Field

The present invention relates to an induction power system, and more particularly, to an induction power system with high power efficiency.

2. Related Art

An inductively coupled power transfer (ICPT) system is configured to effectively transfer energy of a primary side circuit with a stable power supply into a non-contact secondary side circuit a certain distance away through magnetic field induction. The technology has already been widely used in various applications, for example non-contact battery charging in an electric vehicle, cell phones, portable electronic devices, medical implants, as a non-contact power supply in a material handling device and/or system, and public transportation systems. The technology has advantages such as safety, stability, long service life, and easy maintenance.

In an induction power system, the power supply efficiency is always one factor that needs to be enhanced and surmounted. Previously, the secondary side circuit is usually provided with one set of power to drive both the control circuit and load circuit of the system. As the control power and the load power are inseparable, a system standby function supplying power only to the control circuit but not the load circuit is usually unable to be provided. In such systems, when load power is not required at a no load condition, manually switching off the complete secondary side circuit wastes time, while maintaining the entire secondary side circuit wastes power.

In an induction power system, the working frequency is another factor expected to be enhanced and surmounted in order to minimize the size of the system device and the manufacturing cost. However, it has previously been limited by the power loss that occurs due to current switching of its primary side circuit.

SUMMARY OF THE INVENTION

The present invention is an induction power system consisting of a system standby function, increased power supply efficiency, reduced power loss due to current switching, increased system working frequency, and reduced manufacturing cost.

Accordingly, the present invention provides an induction power system configured to connect and drive a load. The induction power system comprises a primary side circuit and a secondary side circuit. The primary side circuit comprises at least one main inductor configured to generate a current-induced magnetic field. The secondary side circuit comprises an induction electrification unit and a power distribution unit. The induction electrification unit comprises a first inductor and a second inductor, and the first inductor and the second inductor are electrically connected in series. The induction electrification unit is adjacent to the primary side circuit, and is configured to generate an induced alternating current (AC). The power distribution unit comprises a first capacitor and a second capacitor. The first capacitor and the first inductor are electrically connected in series, and the first capacitance value matches the first inductance value, so as to generate a series resonance and provide a control power. The second capacitor is electrically connected in parallel with the first capacitor, the first inductor, and the second inductor, and the second capacitance value matches the second inductance value, so as to generate a parallel resonance and provide a load power.

The power distribution unit further comprises a transformer rectifier unit, a switching device, an AC/DC converter and a second control unit. One side of the transformer rectifier unit forms a loop with the first capacitor and the first inductor, such that the control power is converted into a direct current (DC) control power. The switching device is electrically connected to the second inductor in series. When the switching device is turned on, the power distribution unit provides the load power to the load, and when the switching device is turned off, the power distribution unit stops providing the load power. The AC/DC converter is connected in parallel with the second capacitor to convert the load power into a direct current (DC) load power.

The secondary side circuit further comprises a first control unit. The first control unit is configured to accept the DC control power from the power distribution unit, and is able to turn on and turn off the switching device selectively to control the load power.

In order to better achieve the objective, the present invention further provides another secondary side circuit comprising a plurality of induction electrification units and power distribution units, and a control unit. The control unit is configured to accept DC load powers gathered by the power distribution units, and the control unit is electrically connected to a load to control and drive the load.

In addition, the present invention further provides another secondary side circuit comprising a plurality of induction electrification units and power distribution units, and a control unit. The DC load powers gathered by the power distribution units are configured to connect and drive a load. The DC control powers gathered by the power distribution units are connected to the control unit. The control unit is able to turn on and turn off the switches of the power distribution units to control the DC load powers to the load.

The present invention further provides a primary side circuit. The primary side circuit comprises at least one main inductor, and is configured to generate a current-induced magnetic field, such that a secondary side circuit adjacent to the main inductor generates an induced AC. At the same time, the primary side circuit comprises an inverter, a matching inductor, and a main capacitor. The inverter, the matching inductor, the main capacitor, and the main inductor match each other, such that the inverter output consists of a discontinuous current. The inverter comprises a plurality of switches and a driver with a fixed switching frequency. Switching occurs when the discontinuous current is zero or when the discontinuous current flows through the inverse diode of the switch, in order to minimize switching loss.

An effect of the present invention is that the proposed secondary side circuit is able to provide two sets of power at the same time by connecting a plurality of inductors and capacitors in series and in parallel. One set is a load power and provides power needed by the load. The other set is a control power. The control power is a small power configured to provide a power that maintains system standby and enables load power, thereby reducing waste of power at a no load condition, so as to achieve a higher efficiency.

Another effect of the present invention is that the proposed secondary side circuit is able to provide a load power more than three times as large as that in the prior art, such that the efficiency is effectively enhanced.

Another effect of the present invention is that the proposed secondary side circuit has a plurality of induction electrification units and power distribution units, so that it provides a larger power.

Another effect of the present invention is that the proposed primary side circuit has a fixed working frequency, and its inverter is able to output a discontinuous current, such that a power loss resulting from current switching is effectively reduced. Therefore, the working frequency of the induction power system is practically increased, the size of the system device is decreased, and the manufacturing cost is reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention is illustrated below in detail with reference to the embodiments.

Figure 1:
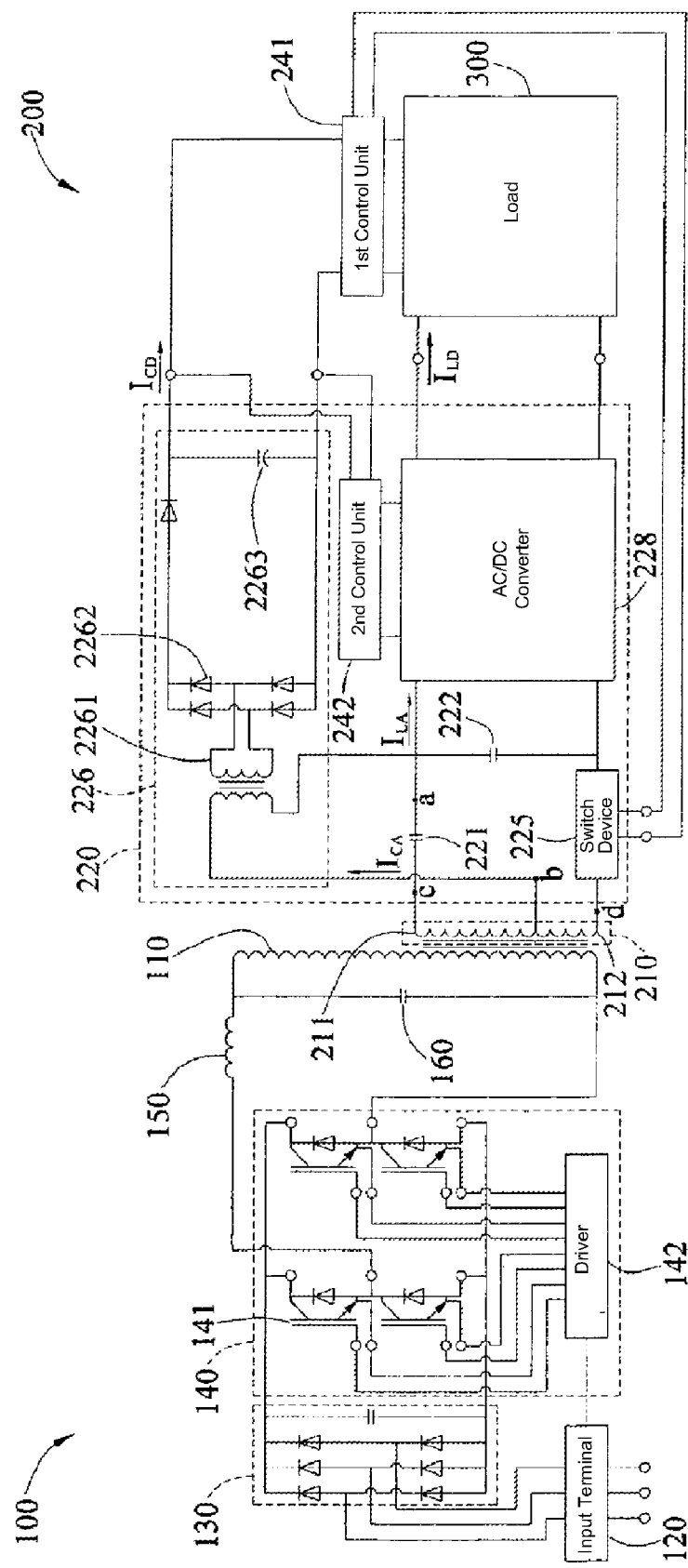
FIG. 1 is an architectural view of an induction power system according to a first embodiment of the present invention.

First, FIG. 1 is an architectural view of an induction power system according to a first embodiment of the present invention. In the first embodiment of the present invention, the induction power system comprises a primary side circuit 100 and a secondary side circuit 200, and is configured to connect and drive a load 300. The primary side circuit 100 at least has a main inductor 110 configured to generate a current-induced magnetic field.

The secondary side circuit 200 comprises an induction electrification unit 210, a power distribution unit 220, and a first control unit 241. The induction electrification unit 210 is adjacent to the main inductor 110 of the primary side circuit 100, and the induction electrification unit 210 comprises a first inductor 211 and a second inductor 212. The first inductor 211 and the second inductor 212 are electrically connected in series. The first and second inductors 211, 212 are located in a range of the current-induced magnetic field generated by the main inductor 110 of the primary side circuit 100, such that a corresponding induced AC is generated.

The power distribution unit 220 comprises a first capacitor 221, a second capacitor 222, a switching device 225, an AC/DC converter 228, a second control unit 242, and a transformer rectifier unit 226. The first capacitor 221 and the first inductor 211 are electrically connected in series, and the capacitance value of the first capacitor 221 matches the inductance value of the first inductor 211 to generate a series resonance, thereby providing an AC control power ($I_{CA}$).

At the same time, the second capacitor 222 is connected in parallel with the first inductor 211, the second inductor 212, and the first capacitor 221, and the capacitance value of the second capacitor 222 matches the inductance value of the second inductor 212 to generate a parallel resonance, thereby providing an AC load power ($I_{LA}$).

The power distribution unit 220 further has a transformer rectifier unit 226. The transformer rectifier unit 226 comprises a transformer 2261, a plurality of rectifier diodes 2262, and a capacitor 2263. One side of the transformer 2261 forms a loop with the first inductor 211 and the first capacitor 221. The transformer 2261 provides functions of circuit isolation and voltage transformation, and the rectifier diodes 2262 and the capacitor 2263 convert the $I_{CA}$ into a DC control power ($I_{CD}$). The $I_{CD}$ may be conveyed and provided to the first control unit 241 and the second control unit 242.

The power distribution unit 220 further has an AC/DC converter 228 and a second control unit 242. The AC/DC converter 228 converts the $I_{LA}$ into a DC load power ($I_{LD}$) to drive and supply power to the load 300. The second control unit 242 accepts the $I_{CD}$) and is electrically connected to the AC/DC converter 228 to control the $I_{LD}$.

The power distribution unit 220 further has a switching device 225. The switching device 225 and the second inductor 212 are connected in series. Therefore, as shown in FIG. 1, the serial connection of the switching device 225 does not influence the operation of the loop formed of the first inductor 211 and the first capacitor 221, that is, the control power ($I_{CA}$ and $I_{CD}$ may be generally referred to as a control power) is not influenced by the operation of the switching device 225. However, when the switching device 225 is turned on, the power distribution unit 220 may provide the load power ($I_{LA}$ and $I_{LD}$ may be generally referred to as a load power), and when the switching device 225 is turned off, the power distribution unit stops providing the load power.

The secondary side circuit 200 further has the first control unit 241. The first control unit 241 is configured to accept the $I_{CD}$ provided by the power distribution unit 220, and is able to turn on and turn off the switching device 225 to control the load power.

In conclusion, the secondary side circuit 200 may distribute the induced AC generated by the induction electrification unit 210 through the power distribution unit 220 into two sets of power, namely, the control power and the load power. The load power has main power of the system, and is configured to supply the power required by the load 300. The control power has relatively small power, and is configured to be supplied to control systems of the first and second control units 241, 242. During a system standby status, when load power is not required at a no load condition, the first control unit 241 may be used to control the switching device 225 to turn off the connection, so as to save the loss of the system main power, and to turn on the switching device 225 at any time, when power is required by the load.

In addition to a main inductor 110, the primary side circuit 100 further comprises a power supply input terminal 120, a rectification circuit 130, an inverter 140, a matching inductor 150, and a main capacitor 160. The power supply input terminal 120 is configured to connect an external AC power supply, for example, an 110V, 220V or 380V AC power supply, to the rectification circuit 130. The rectification circuit 130 converts the AC power supply into a DC power supply for the inverter 140. The inverter 140 is formed of a plurality of switches 141 and a driver 142 with a fixed working frequency to transform the DC power supply into a high-frequency AC power supply. The inverter output is connected to the matching inductor 150, the main capacitor 160 and the main inductor 110. The main capacitor 160 and the main inductor 110 are electrically connected in parallel, and the capacitance value of the main capacitor 160 matches the inductance value of the main inductor 110 to generate a parallel resonance, thereby providing a current-induced magnetic field to enable the secondary side circuit 200. At the same time, the inductance value of the matching inductor 150 matches the inverter output and the parallel resonance, such that the output current of the inverter 140 is discontinuous. The driver 142 is configured to turn on and turn off the switch 141 when the discontinuous current is zero, or when the discontinuous current passes through the inverse diode of the switch 141, so as to minimize the switching losses.

Figure 2A:
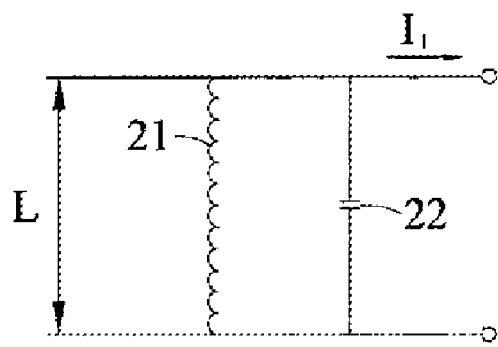
FIG. 2A is a circuit diagram of an inductor-capacitor (LC) parallel resonance in the prior art.

Next, referring to FIG. 2A, in the prior art, when the inductor 21 and the capacitor 22 are connected in parallel to generate a resonance, it is equivalently a current source power supply with a first constant current ($I_1$), and the first constant current ($I_1$) is inversely proportional to the length L of the inductor 21. Therefore, longer inductor 21 results in smaller first constant current ($I_1$).

Figure 2B:
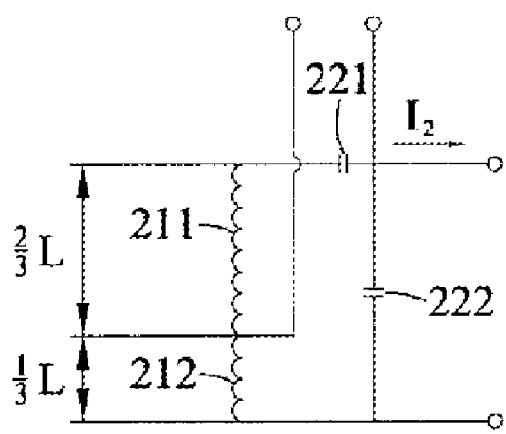
FIG. 2B is a circuit diagram of an inductor-capacitor (LC) serial-parallel resonance of the present invention.

Subsequently, referring to FIG. 2B, in the present invention, when the first inductor 211 and the first capacitor 221 are connected in series to generate a series resonance, and the first inductor 211, the second inductor 212, and the first capacitor 221 are connected in parallel with the second capacitor 222 to generate a parallel resonance, it is equivalently a current source power supply with a second constant current ($I_2$), and the second constant current ($I_2$) is inversely proportional to a length of the second inductor 212. In the embodiment, a length of the second inductor 212 is ⅓ L, and a length of the first inductor 211 is ⅔ L. As the length of the second inductor 212 is only ⅓ L, in the present invention, the second constant current ($I_2$) is three times as large as the first constant current ($I_1$) in the prior art. Therefore, the total output power is also three times as large as that in the prior art.

Of course, the total output power in the present invention is not limited to merely three times as large as that in the prior art. Its amplification ratio may be determined by adjusting a ratio between lengths of the first inductor 211 and the second inductor 212. For example, in the circuit, if a length $L_2$ of the second inductor 212 is ⅕ L, and the total output power may be five times as large as that in the prior art.

Figure 3A:
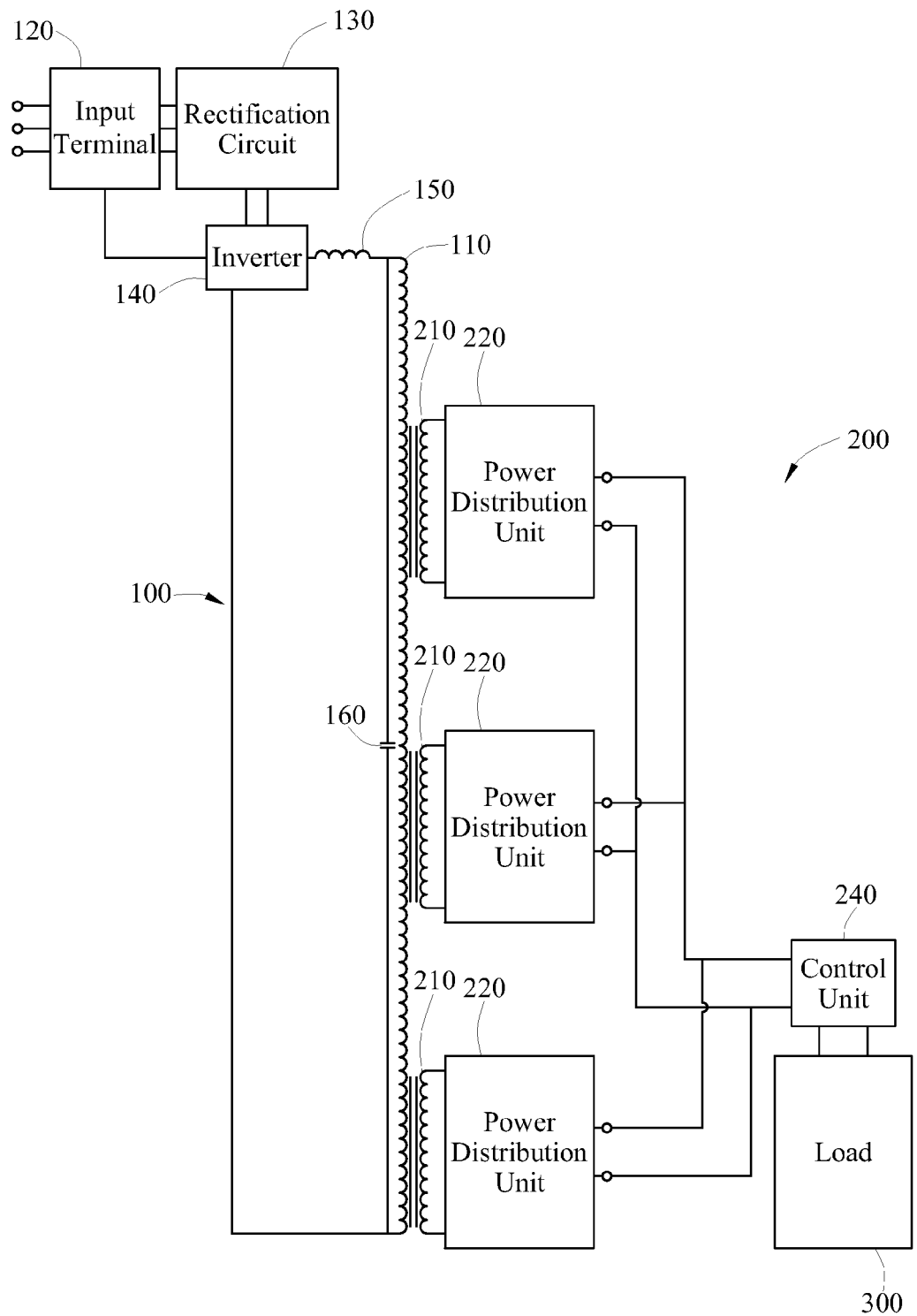
FIG. 3A is an architectural view of an induction power system according to a second embodiment of the present invention.

FIG. 3A is an architectural view of an induction power system according to a second embodiment of the present invention. In the second embodiment of the present invention, the secondary side circuit 200 of the induction power system comprises a plurality of induction electrification units 210 and a plurality of power distribution units 220. The plurality of induction electrification units 210 is all adjacent to the main inductor 110 of the primary side circuit 100. The DC load power gathered by the plurality of power distribution units 220 is conveyed to the control unit 240. The control unit 240 drives and supplies power to the load 300.

Figure 3B:
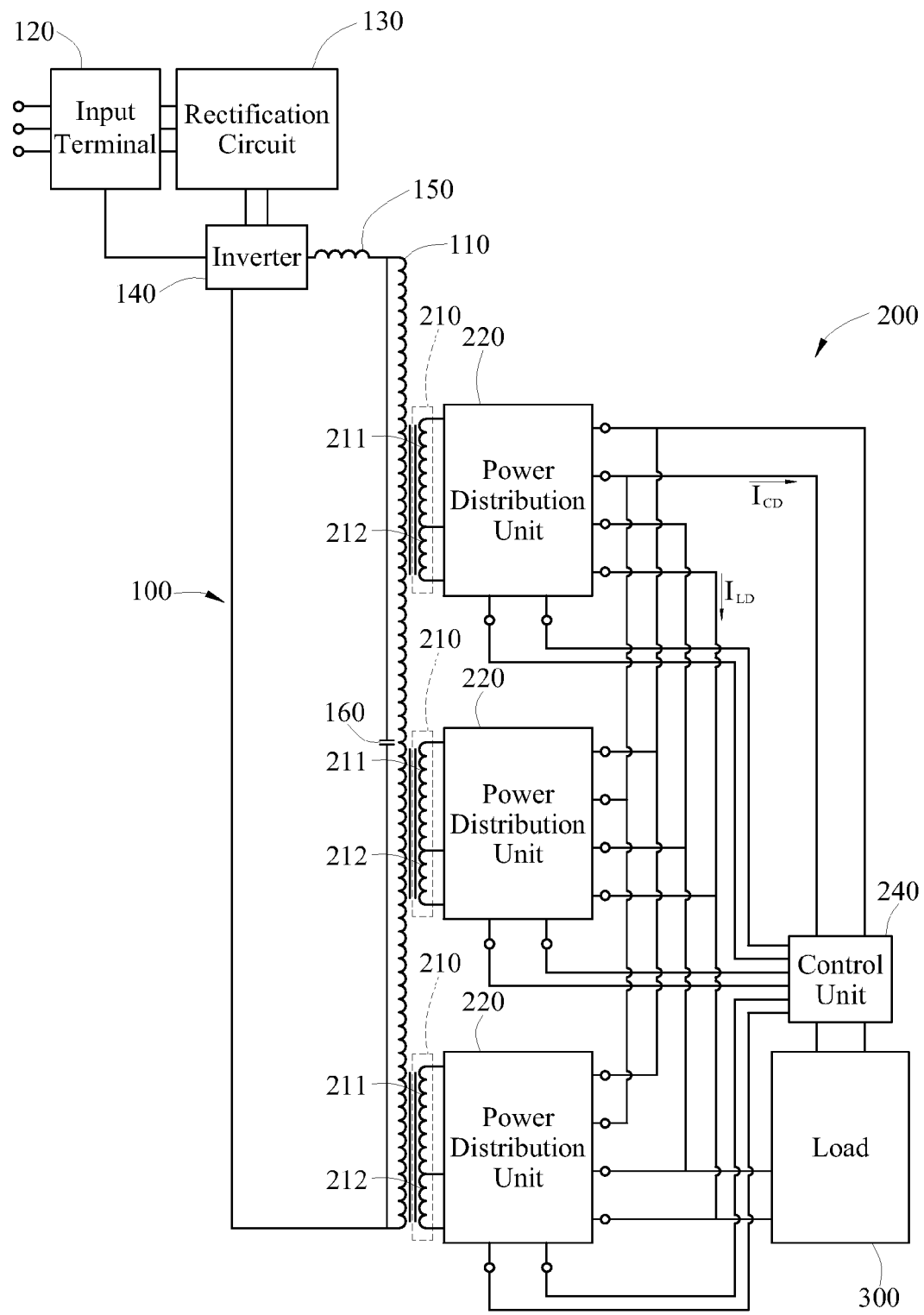
FIG. 3B is an architectural view of an induction power system according to a third embodiment of the present invention.

FIG. 3B is an architectural view of an induction power system according to a third embodiment of the present invention. In the third embodiment of the present invention, the secondary side circuit 200 of the induction power system also comprises a plurality of induction electrification units 210 and a plurality of power distribution units 220, and the plurality of induction electrification units 210 are all adjacent to the main inductor 110 of the primary side circuit 100. The DC control power $I_{CD}$ gathered by each power distribution unit 220 is conveyed to the control unit 240, and the DC load power $I_{LD}$ gathered by each power distribution unit 220 is conveyed to the load 300. In addition, the control unit 240 is able to turn on or turn off a switching device (not shown) in each power distribution unit 220, respectively, thereby controlling the load power to the load 300.

Figure 4:
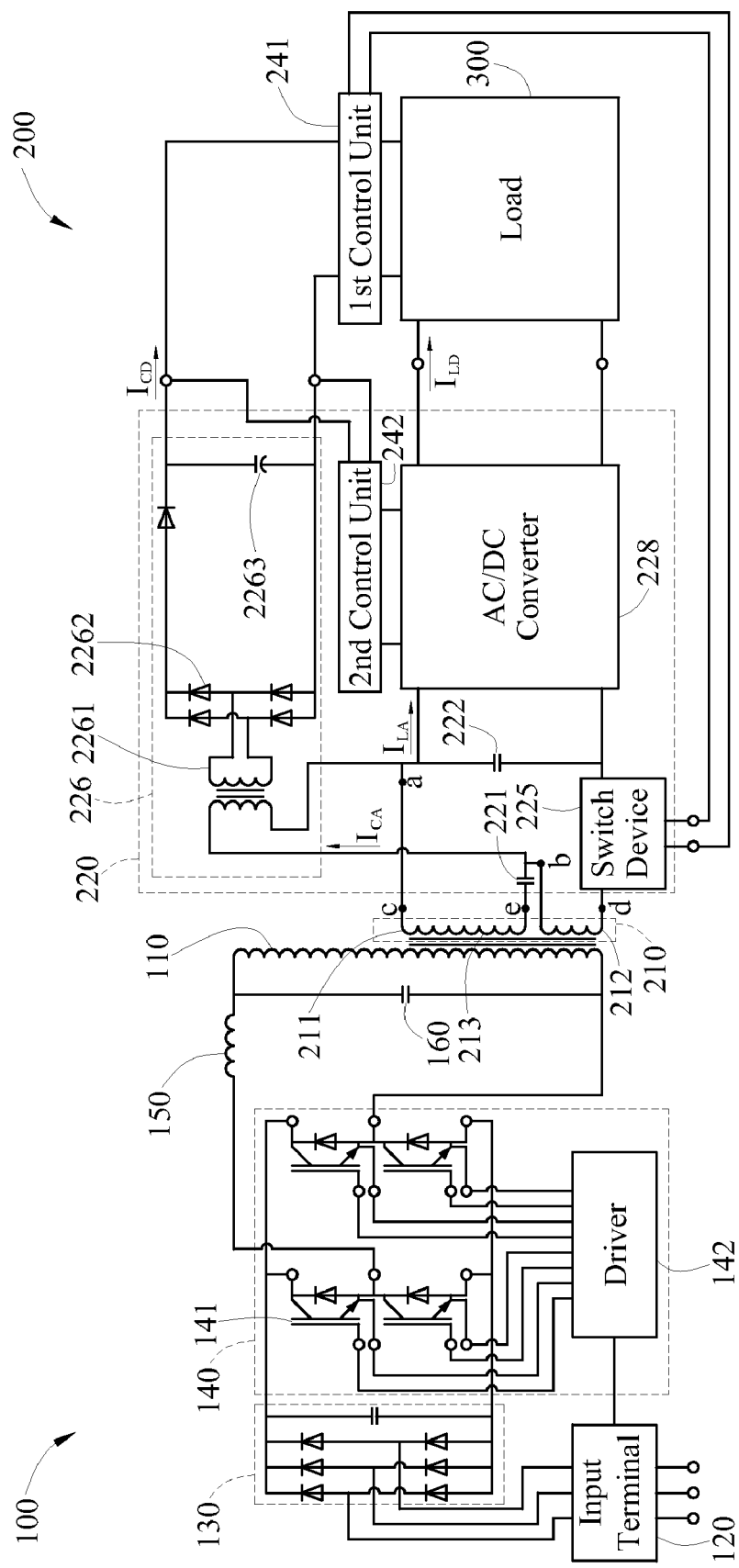
FIG. 4 is an architectural view of an induction power system according to a fourth embodiment of the present invention.

FIG. 4 is an architectural view of an induction power system according to a fourth embodiment of the present invention. In the fourth embodiment of the present invention, the first capacitor 221 is disposed between the first inductor 211 and the second inductor 212, and they are electrically connected in series as in the first embodiment.

Figure 5:
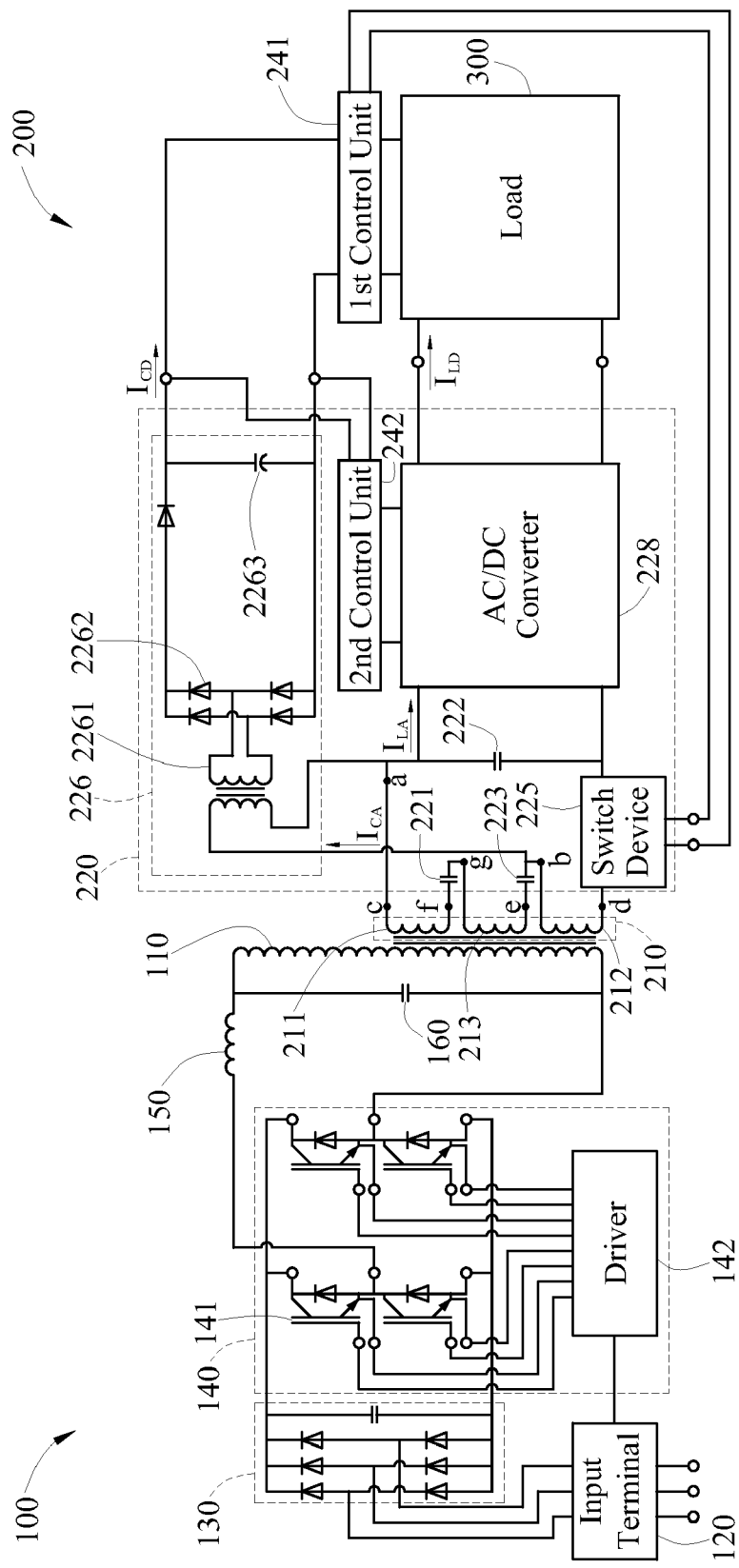
FIG. 5 is an architectural view of an induction power system according to a fifth embodiment of the present invention.
Figure 6A:
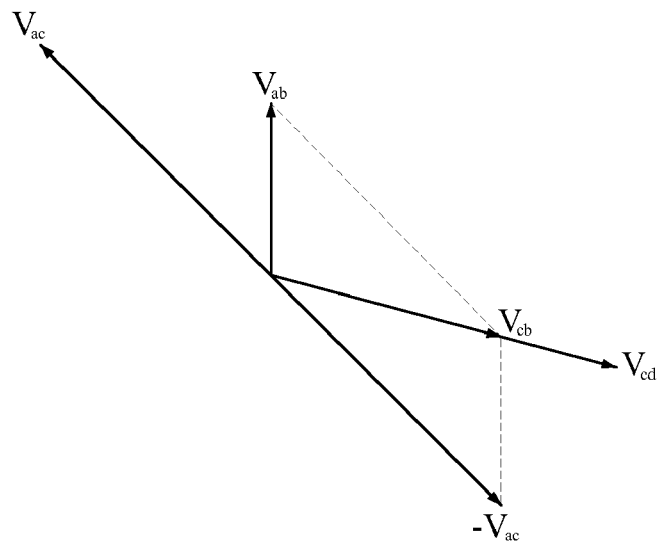
FIG. 6A is a schematic view of terminal voltage changes according to the first embodiment of the present invention.
Figure 6B:
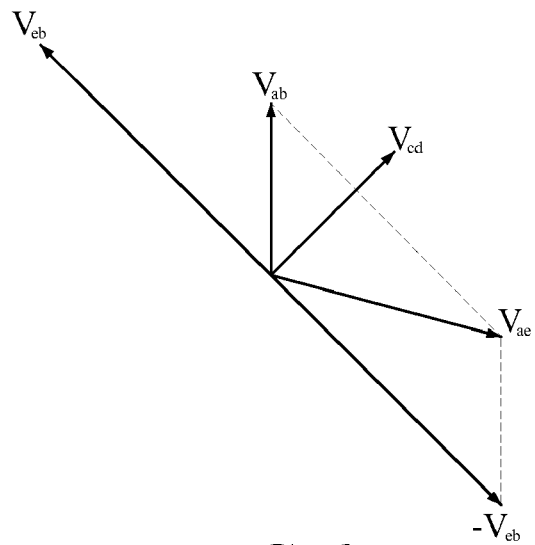
FIG. 6B is a schematic view of terminal voltage changes according to the fourth embodiment of the present invention.
Figure 6C:
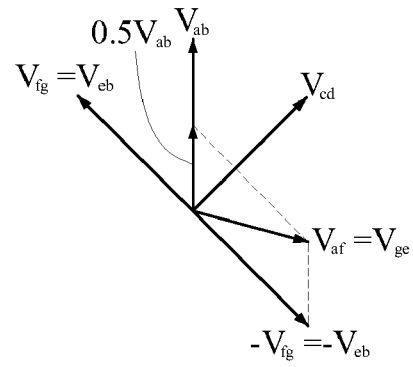
FIG. 6C is a schematic view of terminal voltage changes according to the fifth embodiment of the present invention.

FIG. 5 is an architectural view of an induction power system according to a fifth embodiment of the present invention. In the fifth embodiment of the present invention, the secondary side circuit 200 further comprises a third inductor 213, and a third capacitor 223. The first inductor 211, the first capacitor 221, the third inductor 213, and the third capacitor 223 are electrically connected in series, and form a loop with one side of the transformer 2261. The inductance values of the first inductor 211 and the third inductor 213 matches the capacitance values of the first capacitor 221 and the third capacitor 223, respectively, to generate a series resonance, and thereby providing a control power. The second capacitor 222 is electrically connected in parallel with the first inductor 211, the first capacitor 221, the third inductor 213, the third capacitor 223, and the second inductor 212. The inductance value of the second inductor 212 matches the value of the second capacitor 222 to generate a parallel resonance, and thereby providing a load power.

Referring to FIGS. 1, 4, 5, 6A, 6B, and 6C, in the first embodiment, the first inductor 211 resonates with the first capacitor 221, such that the terminal voltage (Vac) of the first capacitor 221 and the terminal voltage (Vcb) of the first inductor 211 have relatively large values. The terminal voltage (Vcb) of the first inductor 211 further comprises two parts. The first part is a terminal voltage that resonates with the first capacitor 221, which has the same size and an inverse phase. The second part is an induction electrification voltage enabled by the main inductor 110 of the primary side circuit 100, and is a constant voltage (Vab). In the first embodiment, formulae of the terminal voltage vector are as follows.

$$Vac = Va - Vc$$

$$Vcb = Vc - Vb$$

$$Vab = Va - Vb = Vac + Vcb$$

$$Vbd = Vb - Vd = 0.5 Vcb$$

$$Vcd = Vc - Vd = Vcb + Vbd$$

In the fourth embodiment, the terminal voltage of each component is the same as that in the first embodiment. However, in the fourth embodiment, the first capacitor 221 is located between the first inductor 211 and the second inductor 212, thus having an accumulated terminal voltage (Vcd) with a smaller value than that in the first embodiment. Also, the same constant voltage (Vab) is generated. In the fourth embodiment, formulae of the terminal voltage vector are as follows.

$$Vae = Va - Ve$$

$$Veb = Ve - Vb$$

$$Vab = Va - Vb = Vae + Veb$$

$$Vbd = Vb - Vd = 0.5Vae$$

$$Vcd = Vc - Vd = Vab + Vbd$$

In the fifth embodiment, the first inductor 211 and the third inductor 213 resonates with the first capacitor 221 and the third capacitor 223 respectively, so the terminal voltage Vaf, Vfg, Vge, Veb of each component only has a smaller value being one half of that in the first embodiment. Also, the same constant voltage (Vab) is generated. In the fifth embodiment, formulae of the terminal voltage vector are as follows.

$$Vaf = Va - Vf$$

$$Vfg = Vf - Vg$$

$$Vge = Vg - Ve$$

$$Veb = Ve - Vb$$

$$Vab = Va - Vb = Vaf + Vfg + Vge + Veb$$

$$Vbd = Vb - Vd = Vaf + Vge$$

$$Vcd = Vc - Vd = Vab + Vbd$$

Of course, reduction of the terminal voltages of the series resonant inductor and capacitor components of the secondary side circuit is not limited to one half of that in the first embodiment. The reduction ratio is able to be determined by adjusting the number of the series resonant inductor and capacitor components. For example, if another inductor and another capacitor are further added such that the circuit has three equivalent inductors and three equivalent capacitors, and the inductors and capacitors are electrically connected in series in an "inductor-capacitor-inductor-capacitor-inductor-capacitor" sequence with inductance values and capacitance values matching each other in sequence to generate a series resonance, the terminal voltage of each component is able to be reduced to one third of that in the first embodiment.

As can be seen from the above, in the fifth embodiment of the present invention, the secondary side circuit is able to avoid component damages caused by an instant high voltage resulting from resonance in the LC resonance circuit, and to avoid cost increase resulting from using higher voltage rating components, and to meet voltage regulations of different countries.

The effect of the present invention is such that in the proposed induction power system, as a plurality of inductors and capacitors are connected in series and in parallel in the secondary side circuit, the system is able to provide two sets of powers. One set is a load power, which is a main power, and is configured to provide a power required by a load. The other set is a control power, which is a small power, and is configured to provide a power required to maintain system standby and enable a load power. Therefore, system power waste may be reduced. At the same time, the present invention further provides a secondary side circuit having a plurality of induction electrification units and power distribution units, so as to provide a larger power to the load. At the same time, the secondary side circuit of the present invention may practically provide a power more than three times as large as that in the prior art, such that the power supply efficiency is effectively enhanced.

What is claimed is:

1. An induction power system, configured to connect and drive a load, comprising:
    a primary side circuit, comprising at least one main inductor configured to generate a current-induced magnetic field; and
    a secondary side circuit, comprising:
        an induction electrification unit, comprising a first inductor and a second inductor, wherein the first inductor and the second inductor are electrically connected in series, and the induction electrification unit is adjacent to the primary side circuit and is configured to generate an induced alternating current (AC); and
        a power distribution unit, comprising:
            a first capacitor, wherein the first capacitor and the first inductor are electrically connected in series, and the first capacitance value matches the first inductance value to generate a series resonance, thereby providing a control power; and
            a second capacitor, wherein the second capacitor is electrically connected in parallel with the first capacitor, the first inductor, and the second inductor, and the second capacitance value matches the second inductance value to generate a parallel resonance, thereby providing a load power.

2. The induction power system according to claim 1, wherein the power distribution unit further comprises a switching device, the switching device is electrically connected to the second inductor in series, the power distribution unit provides the load power to the load when the switching device is turned on, and the power distribution unit stops providing the load power when the switching device is turned off.

3. The induction power system according to claim 2, wherein the secondary side circuit further comprises:
    a transformer rectifier unit, disposed at the power distribution unit, wherein one side of the transformer rectifier unit forms a loop with the first capacitor and the first inductor, such that the control power is converted into a direct current (DC) control power;
    an AC/DC converter, disposed at the power distribution unit, wherein the AC/DC converter is configured to accept the load power and converts the load power into a DC load power;
    a second control unit, disposed at the power distribution unit and configured to accept the DC control power and to control and drive the AC/DC converter; and
    a first control unit, electrically connected to the power distribution unit and the load, and configured to accept the DC control power and to control the turning-on and turning-off of the switching device selectively.

4. The induction power system according to claim 2, wherein the secondary side circuit further comprises a third inductor and a third capacitor; the first capacitor, the first inductor, the third capacitor, and the third inductor are electrically connected in series to generate a series resonance, thereby providing a control power; and the second capacitor is electrically connected in parallel with the first capacitor, the first inductor, the third capacitor, the third inductor, and the second inductor to generate a parallel resonance, thereby providing a load power.

* * * * *